United States Patent
Sohn

[19]

[11] Patent Number: 5,886,821
[45] Date of Patent: Mar. 23, 1999

[54] LENS ASSEMBLY FOR MINIATURE MOTION SENSOR

[75] Inventor: Alexander Sohn, Fuquay-Varina, N.C.

[73] Assignee: Fresnel Technologies, Inc., Fort Worth, Tex.

[21] Appl. No.: 942,518

[22] Filed: Oct. 2, 1997

[51] Int. Cl.$^6$ ............................... G02B 27/10; G01J 5/08
[52] U.S. Cl. .................... 359/619; 359/621; 359/457; 359/463; 250/342; 250/338.3; 250/353
[58] Field of Search ..................... 359/619, 620, 359/621, 622, 623, 626, 455, 457, 463; 250/342, 338.3, 349, 353

[56] References Cited

U.S. PATENT DOCUMENTS

| | | | |
|---|---|---|---|
| 4,672,206 | 6/1987 | Suzuki et al. | 250/342 |
| 4,896,039 | 1/1990 | Fraden | 250/342 |
| 5,107,120 | 4/1992 | Tom | 250/342 |
| 5,567,941 | 10/1996 | Fujikawa et al. | 250/353 |
| 5,581,402 | 12/1996 | Taylor | 359/463 |

Primary Examiner—Loha Ben
Attorney, Agent, or Firm—James E. Bradley

[57] ABSTRACT

A motion sensor has a pyroelectric detector, a Fresnel lens array, a reducing lens, and a housing. The detector has two elements located side-by-side and the lens array has a plurality of lenslets which are integrally formed. The reducing lens demagnifies the elements. The reducing lens has grooves which run in parallel directions and face toward the elements. The lens array illuminates the detector by focusing infrared light through the reducing lens and onto the elements. The reducing lens makes the elements appear smaller and closer together. The reduced image of the detector allows the lenslets to be spaced more closely than prior art lenslets, thereby making the angular separation less than the angular separation of prior art sensors. Alternatively, the detector housing may be made smaller while maintaining the same angular separation of prior art sensors. If an object moves between two zones, the sensor detects the movement and triggers an alarm, turns on a light, or initiates some other process.

11 Claims, 6 Drawing Sheets

LENS ASSEMBLY FOR MINIATURE MOTION SENSOR

TECHNICAL FIELD

This invention relates in general to motion sensors and in particular to lens assemblies for motion sensors.

BACKGROUND ART

Motion sensors which detect movement for security and lighting applications are well known in the prior art. However, in order to make motion sensors less conspicuous, whether for aesthetic, safety or security purposes, the lens arrays utilized by motion sensors must be smaller.

Lens arrays, particularly fresnel-type lens arrays, make motion sensors more effective and economical. The individual lenslets of a lens array collect and direct infrared radiation onto a pyroelectric detector. The size and placement of the lenslets, along with other characteristics, determine the range of the motion sensor and its sensitivity to small movements. Generally, the detection range and sensitivity of the motion sensor are proportional to the size of the lens array.

Three parameters control the effectiveness of a motion sensor. Radial range is the range of the motion sensor as measured from the motion sensor to the farthest point at which it will detect motion. This parameter is limited by the collection efficiency of the lenslets and the sensitivity of the pyroelectric detector. The second parameter, angular range, is the angular spread within which the motion sensor will function. Angular range is usually limited by factors such as the curvature and size of the lens array, off-axis performance of the lenslets, and the angular acceptance of the pyroelectric detector. The third parameter is zone density which is measured as the number of detection zones or beams within an angular segment. This parameter determines the distance that a target has to move before the motion sensor detects it. Zone density is most affected by the focal length of the lenslets and the distance between the elements of a two element pyroelectric detector. Focal length is directly related to the distance from the lenslets to the pyroelectric detector.

Most motion sensors use pyroelectric detectors with two, one millimeter wide sensitive elements wherein the inner edges of the elements define a gap between the elements that is one millimeter wide. Since there is often no choice in the geometry of the pyroelectric detector used, the only way to increase the zone density has been to use longer focal length lenslets. However, this method has the disadvantage of creating a large, often unsightly and conspicuous package which is usually undesirable in most security and lighting applications.

DISCLOSURE OF INVENTION

A motion sensor has a pyroelectric detector, a fresnel lens, a reducing lens therebetween, and a housing. The sensor has a net focal length that is measured from the lens array to the detector. The detector has two elements located side-by-side, and the lens array has a plurality of lenslets which are integrally formed.

The reducing lens essentially demagnifies the elements. In the preferred embodiment, the reducing lens is a fresnel-type lens with grooves that face toward the elements. The grooves run substantially perpendicular to a line between the detector elements, and substantially parallel to the surface containing these elements. The lens array illuminates the detector by transmitting and focusing infrared light through the reducing lens to the elements. The configuration of the reducing lens creates a "virtual detector" or reduced image of the detector. The reducing lens makes the elements appear smaller and closer together. The reduced image of the detector allows the lenslets to be spaced more closely than prior art lenslets, thereby making the zone density greater than the zone density of prior art sensors of similar size. Alternatively, the sensor enables smaller sensors to provide the same zone density as much large prior art sensors.

If an object moves from one zone to another zone, the sensor detects the movement and sends a signal along a circuit to turn lights on or trigger an alarm. If movement occurs within a space between two zones, the sensor will not be able to detect the movement. However, since the zone density is greater than prior art zone densities, the sensor has more closely spaced zones than prior art sensors. Consequently, the dead spaces are smaller and the sensor is more sensitive to movement.

BEST MODE FOR CARRYING OUT THE INVENTION

Figure 1:
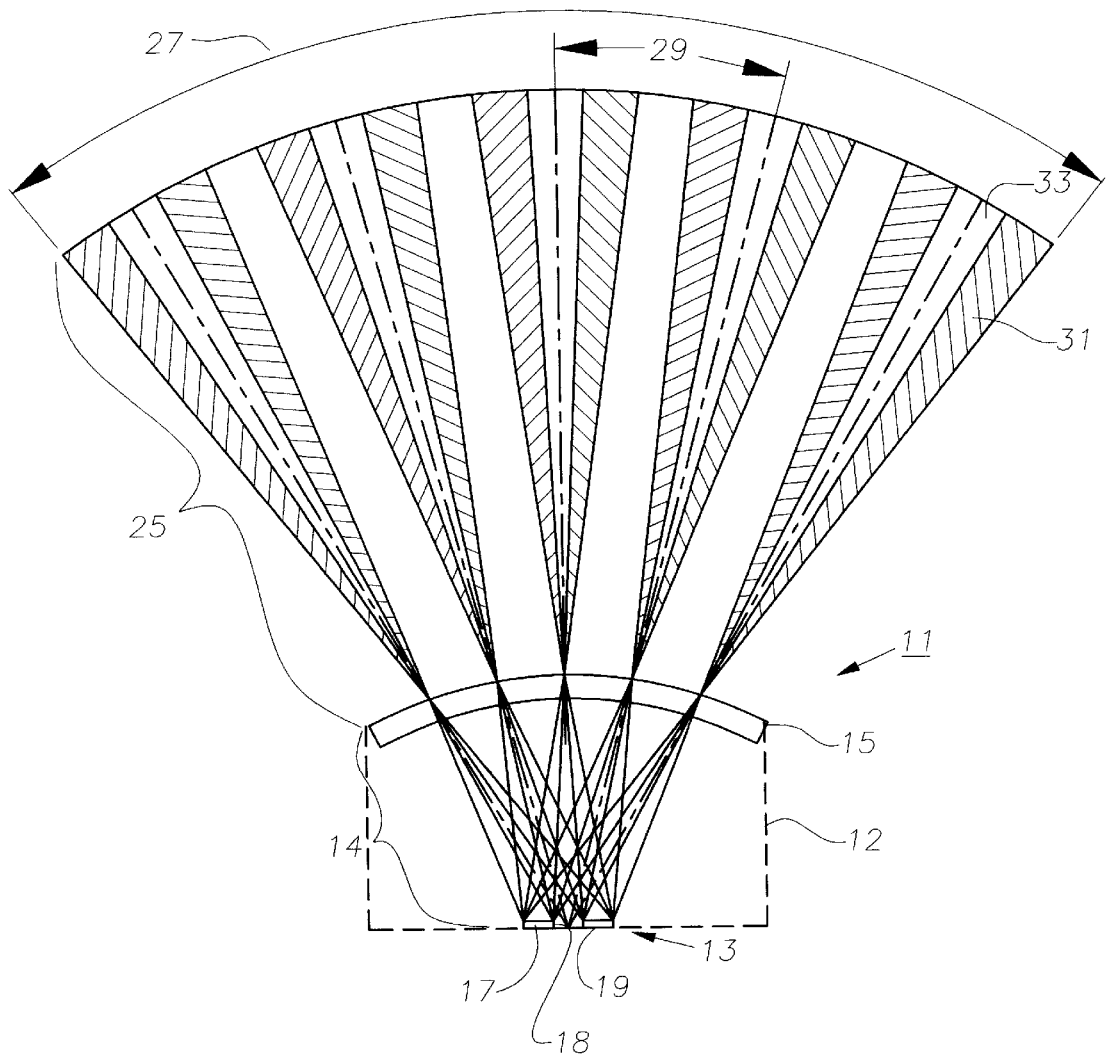
FIG. 1 is a schematic drawing of a prior art motion sensor.

Referring to FIG. 1, a conventional motion sensor 11 is shown. Motion sensor 11 comprises a pyroelectric or infrared detector 13 on a rearward end, a Fresnel lens array 15 on a forward end, and a housing 12 shown in phantom. Sensor 11 has a focal length 14 that is generally measured from the center of lens array 15 to detector 13. Detector 13 has two 1 mm wide sensitive elements 17, 19 with inner edges 18 that are spaced 1 mm apart. For each thermal signal detected by motion sensor 11, one of elements 17, 19 has a positive voltage output and the other has a negative voltage output. These voltage outputs can then be further processed to turn on a light, set off an alarm, etc.

Figure 2:
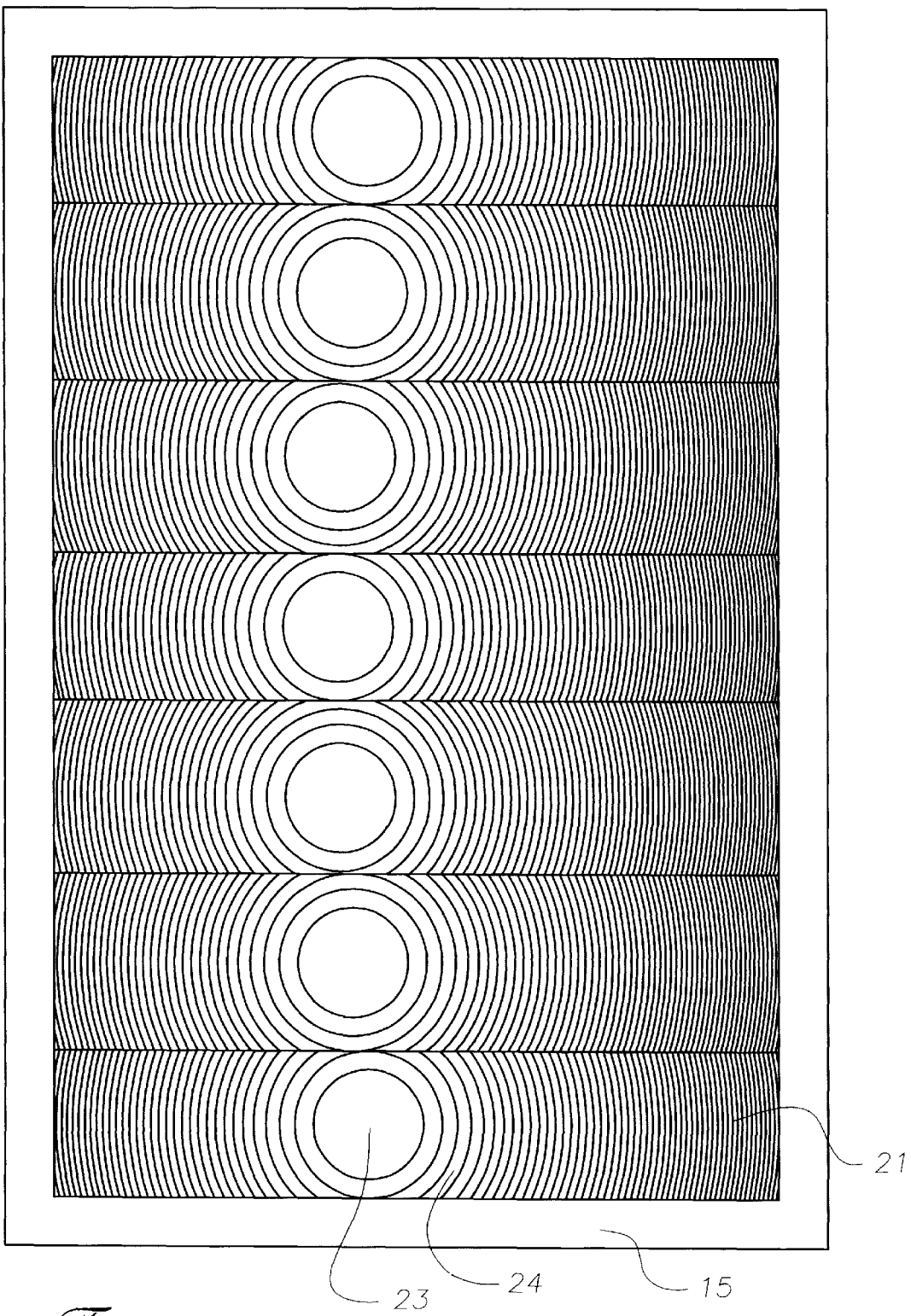
FIG. 2 is a front view of a prior art lens array for the motion sensor of FIG. 1.

Lens array 15 is a flexible sheet of plastic which has several lenses molded into its surface and transmits infrared light. Referring also to FIG. 2, the particular lens array 15 shown has a plurality of separate, side-by-side lenslets 21 which are integrally formed in lens array 15. In FIG. 2, each lenslet 21 has an optical center 23 and a plurality of aspheric surfaces 24 located at different radial distances from optical center 23. Optical centers 23 are spaced apart the minimal distance required for focal length 14. The lenslets of prior art lens arrays are arranged in many different patterns with different types of lenses.

Lens array 15 illuminates detector 13 by transmitting and focusing infrared radiation in zones 31 to elements 17, 19. Sensor 11 has three operating parameters that are established by its components: a radial range 25, an angular range 27, and an angular separation 29 between zones 31. Angular separation 29 refers to the angular distance an object must move so that its image formed by one lens of the lens array is in the location on the pyroelectric detector corresponding to the location of the image formed by an adjacent lens of the lens array before the movement occurs. If an object moves within radial range 25, angular range 27 and at least two zones 31, sensor 11 sends characteristic positive and negative signals along a circuit (not shown) to turn on lights, trigger an alarm, or produce some other occurrence. If movement occurs only within a dead space 33 between two zones 31, sensor 11 will not be able to detect the movement. The width of dead spaces 33 may be reduced by increasing focal length 14. However, increasing focal length 14 results in a larger, more conspicuous and unsightly motion sensor 11.

Figure 3:
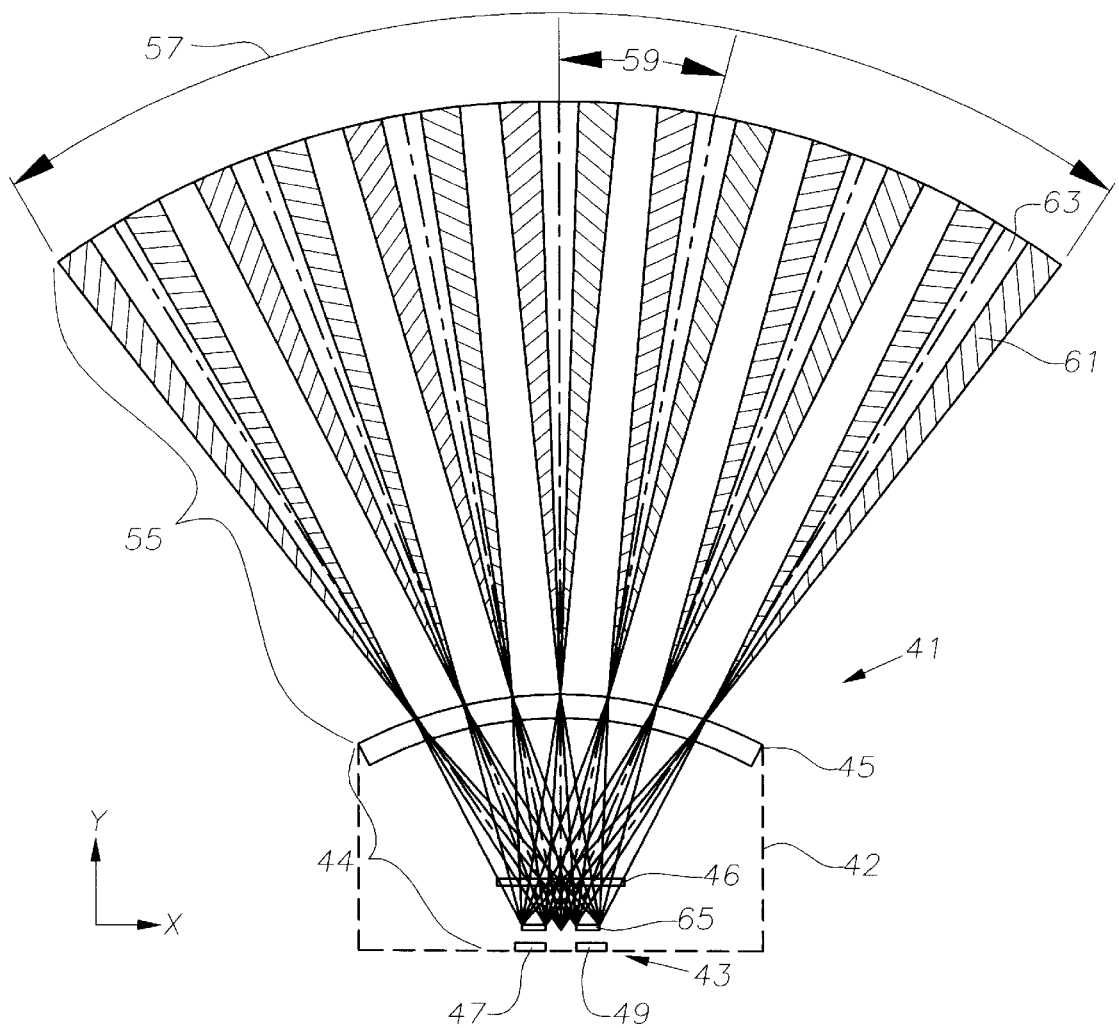
FIG. 3 is a top view schematic drawing of a motion sensor constructed in accordance with the invention.
Figure 4:
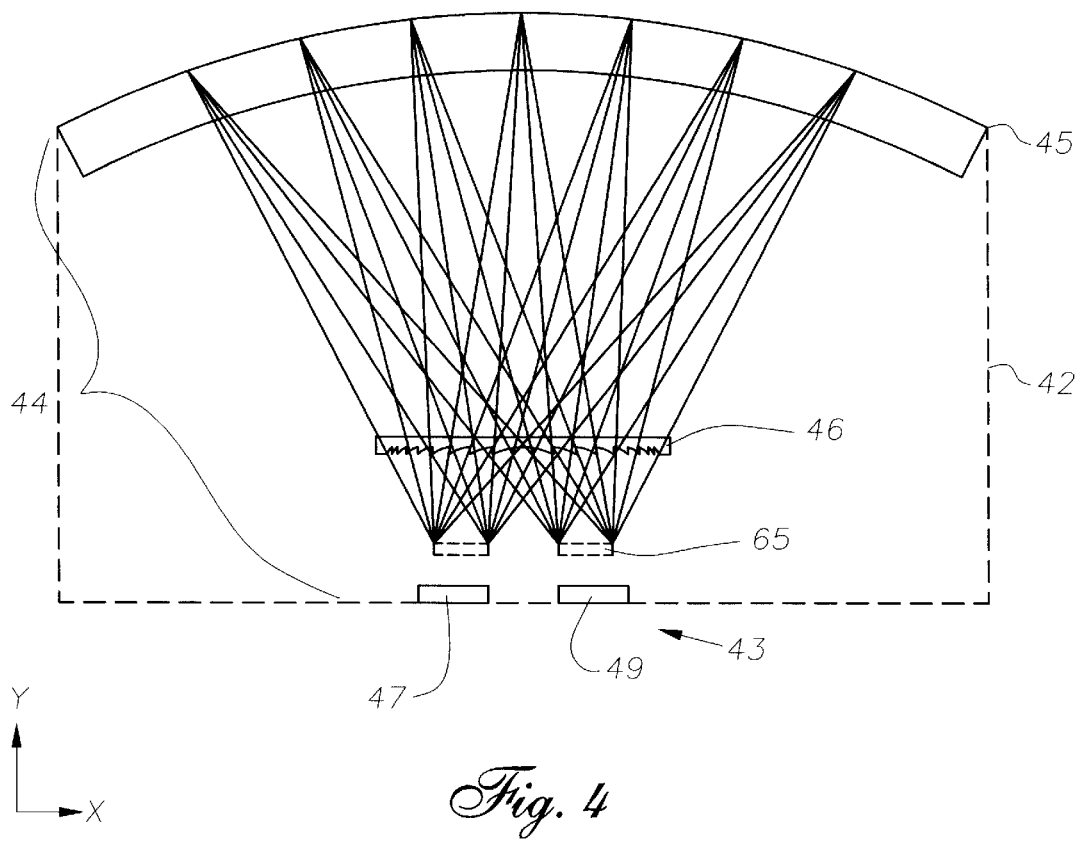
FIG. 4 is an enlarged top view schematic drawing of a portion of the motion sensor of FIG. 3.

Referring to FIGS. 3 and 4, a motion sensor 41 constructed in accordance with the invention is shown. Motion sensor 41 comprises a housing 42, shown in phantom, a pyroelectric detector 43 on a rearward end, a Fresnel lens array 45 on a forward end, and a reducing lens 46 located between Fresnel lens array 45 and pyroelectric detector 43. Lens array 45 is substantially similar to lens array 15. Sensor 41 has a net focal length 44 that is measured from lens array 45 to detector 43. Focal length 44 may be set as desired and may be the same as focal length 14 of FIG. 1. Detector 43 has two elements 47, 49 which are substantially similar to elements 17, 19. Elements 47, 49 are located side-by-side along an x-axis which is on a surface containing the light-sensitive faces of elements 47, 49. The space between elements 47, 49 equals the width of each of the elements 47, 49.

Figure 5:
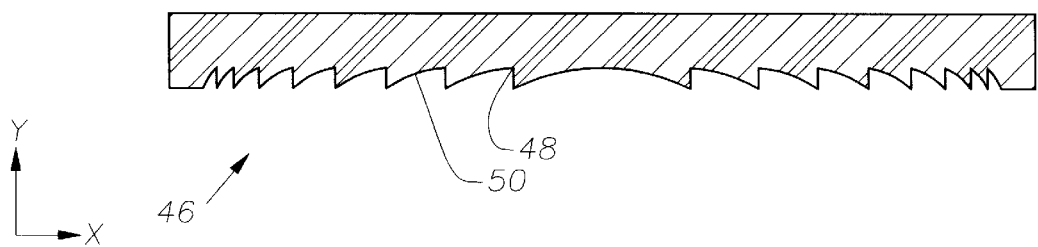
FIG. 5 is a top view of a reducing lens of the motion sensor of FIGS. 3 and 4.
Figure 6:
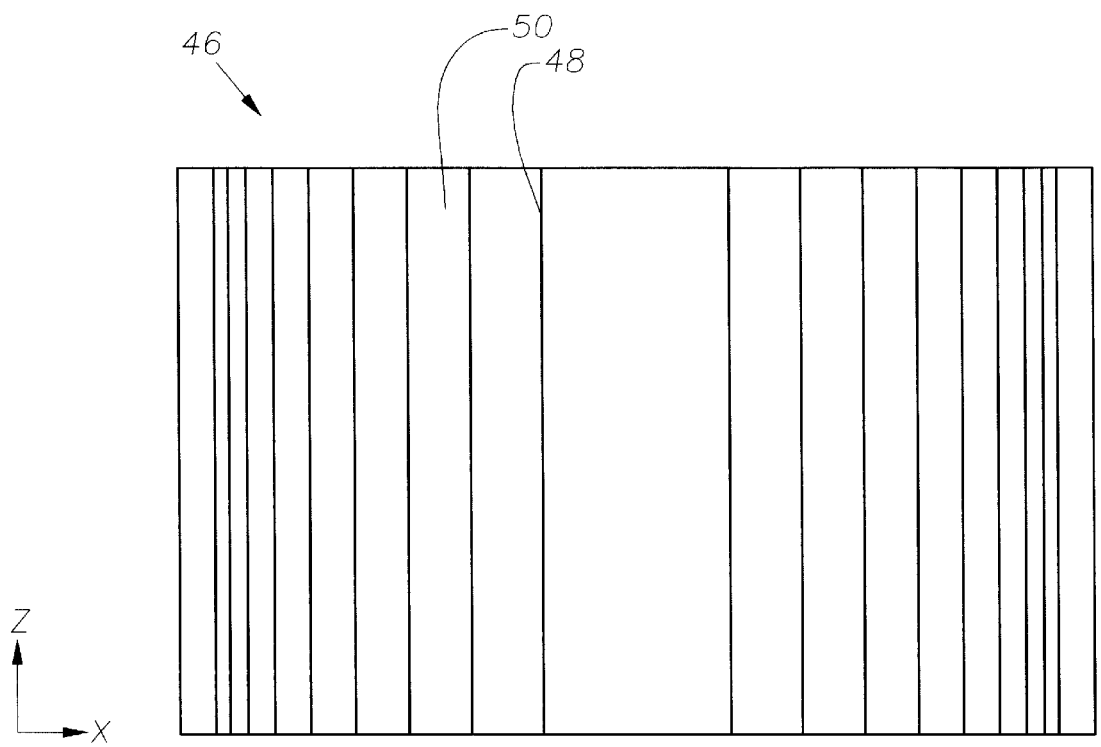
FIG. 6 is an elevational view of the grooved side of the reducing lens of FIG. 5.
Figure 7:
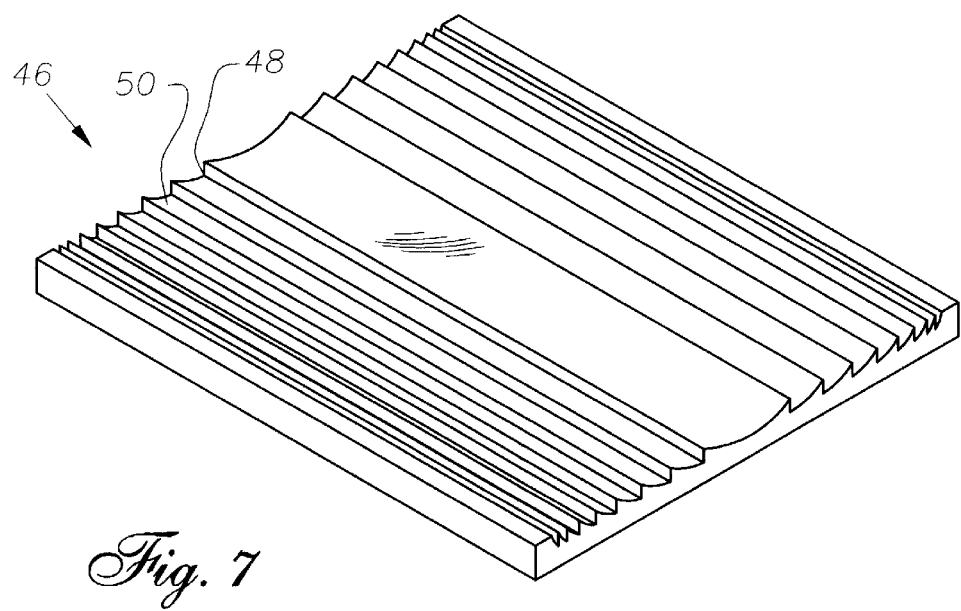
FIG. 7 is a perspective view of the reducing lens of FIG. 5.

A reducing lens 46 is placed in the light path between lens array 45 and detector 43 to essentially demagnify elements 47, 49. In the preferred embodiment of FIGS. 3–7, reducing lens 46 is a negative focal length acylindrical Fresnel lens. Reducing lens 46 has a plurality of grooves 50 which are interconnected by substantially flat walls or transition surfaces 48. Each groove 50 is an inclined surface when viewed in cross-section as shown in FIG. 5. The inclined surface of each groove 50 when viewed in cross-section is preferably concave, curved and acylindrical. The total effect of the collection of the inclined surfaces of grooves 50 is to mimic a negative focal length acylindrical lens. Grooves 50 run or extend in parallel directions substantially perpendicular to the x-axis. Transition surfaces 48 also run in straight lines substantially perpendicular to the x-axis. In the embodiment shown, grooves 50 of reducing lens 46 are on a side facing toward detector 43, but alternately may face away from detector 43.

Figure 8:
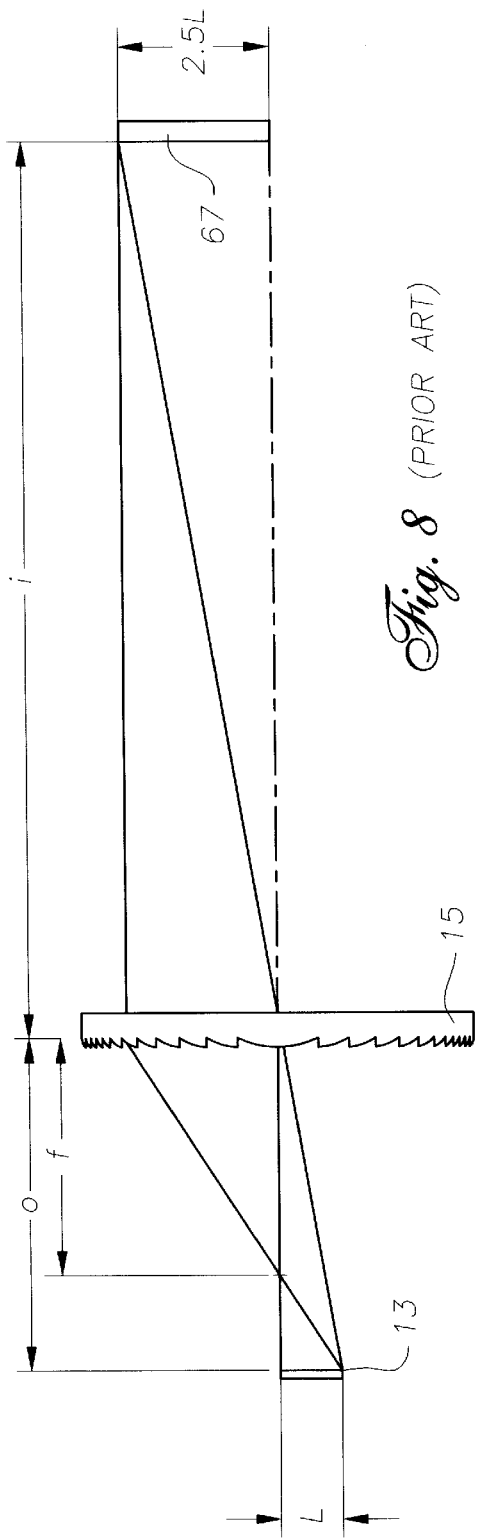
FIG. 8 is a schematic representation of the size of an image of a detector element which occurs with the prior art motion sensor of FIG. 1.
Figure 9:
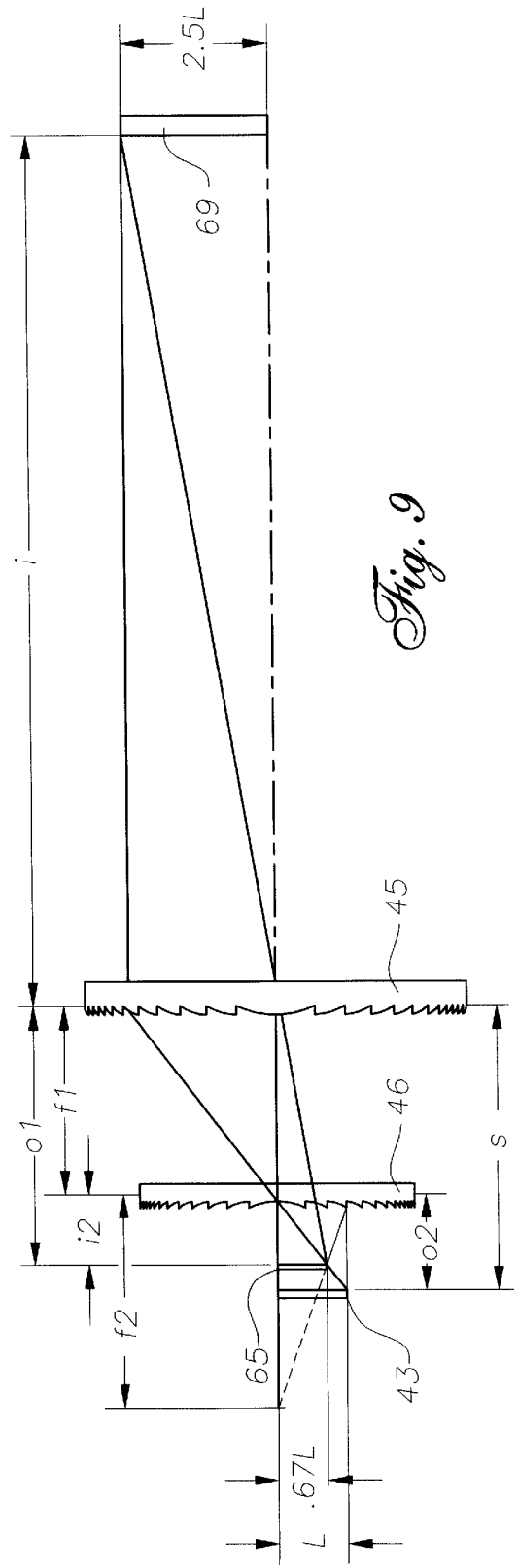
FIG. 9 shows the substantial reduction in the size of the motion sensor which can be attained with this invention, given the same zone density depicted in FIG. 8.

Geometrical optics and the thin lens equation are used to determine the relative spacing of the lens array, the reducing lens, and the detector elements. FIG. 8 illustrates a prior art motion sensor, such as in FIG. 1, while FIG. 9 illustrates a motion sensor of this invention. For the purpose of this discussion, we will consider a detection zone to be defined by the image 67, 69 of a detector element. Referring to Optics by K. D. Moller (University Science Books 1988), the thin lens equation may be expressed as:

$$\frac{1}{i} - \frac{1}{o} = \frac{1}{f}$$

where i is the distance from lens 15 to the formed image of detector 13, o is the distance between lens 15 and detector 13, which is considered the object, and f is the focal length of lens 15. The thin lens equation is a good approximation for many cases of Fresnel lenses and works well to describe the behavior of the present invention.

In the simple case of a lens with focal length f magnifying an object or detector 13 of length L at a distance o from lens 15, we find that an image 67 of detector 13, which determines the size of the detection zone, is formed at i. The size of image 67 can be found by calculating the magnification, $$M = \frac{i}{o}$$

If the magnification is 2.5, the length of the image will be 2.5 times L.

Referring to FIG. 9, since the purpose of this invention is essentially to reduce the size of the motion sensor and/or the image 69 of detector 43, lens 45 with a focal length of f1 and reducing lens 46 with a focal length of f2 are used so that a smaller image 65 of detector 43 appears at the object distance o1 of lens 45. The choice of distance o2 from detector 43 to reducing lens 46 and focal length f2 will determine the amount by which the size of image 65 is reduced. If, for example, the desired reduction of image 65 is to be ⅔ of the size of detector 43, detector 43 is placed at 0.5 f2 from reducing lens 46 using both the thin lens equation and the magnification. Focal length f1 can then be chosen and placed at the proper distance o1 to obtain the image size 69 appropriate for the application. In this example, the image size 69, and, hence the zone density, is chosen to be equivalent to that of the prior art motion sensor in FIG. 8, thus the overall length S of the motion sensor is reduced. Conversely, focal length f1 could also be chosen to reduce the image 69 of the detector 43 while keeping the overall size of the motion sensor the same.

In operation, lens array 45 illuminates detector 43 by transmitting and focusing infrared light originating in zones 61 through reducing lens 46 to elements 47, 49. Sensor 41 has three operating parameters that are established by its components: a radial range 55, an angular range 57, and an angular separation 59 between zones 61 (FIG. 3). The configuration of reducing lens 46 creates a "virtual detector" or reduced image 65 of detector 43. Reducing lens 46 makes elements 47, 49 appear smaller and closer together when viewed from lens array 45. Reduced image 65 of detector 43 allows the optical centers (not shown) of lens array 45 to be spaced more closely than optical centers 23 of lens array 15, thereby making the angular separation 59 of zones 61 less than the angular separation 29 of zones 31 of sensor 11 (FIG. 1). Similarly, the use of reducing lens 46 also allows lens array 45 to be located closer to detector 43 and have a shorter focal length compared to a conventional device with the same angular separation between beams.

If an object moves within radial range 55, angular range 57 and at least two zones 61, sensor 41 sends a characteristic signal along a circuit (not shown) to turn lights on or trigger an alarm. If movement occurs only within a dead space 63 between two zones 61, sensor 41 will not be able to detect the movement. However, since angular separation 59 is less than angular separation 29, angular range 57 contains more zones 61 than angular range 37, and zones 61 are more closely spaced. Consequently, dead spaces 63 are smaller in width than dead spaces 33 and sensor 41 is more sensitive to movement than sensor 11 (FIG. 1), if the electronic gain of the unit is increased to compensate for the additional optical loss caused by reducing lens 46 and for the smaller lenslet size.

The invention has several advantages. Using a reducing lens results in a substantially denser zone pattern which increases the ability of the motion sensor to detect small amounts of movement. This configuration allows more zones to be used in the same angular range and/or provides a more compact, less conspicuous motion sensor.

While the invention has been shown in only one of its forms, it should be apparent to those skilled in the art that it is not so limited, but is susceptible to various changes without departing from the scope of the invention. For example, the invention could be employed with devices having more than two pyroelectric detector elements.

I claim:

1. A motion sensor, comprising:

a housing;

a first optical element in the housing capable of focusing infrared radiation;

a pyroelectric detector having two elements located in the housing and separated from one another for receiving the focused infrared radiation; and a second optical element located in an optical path within the housing between the first optical element and the detector to produce a reduced image of the detector.

2. The motion sensor of claim 1 wherein the second optical element is a negative focal length Fresnel lens.

3. The motion sensor of claim 1 wherein the second optical element is a negative focal length, cylindrical Fresnel lens having a plurality of grooves which run in directions parallel to one another.

4. The motion sensor of claim 3 wherein the detector elements are located side-by-side along an x-axis; and wherein the grooves run in directions substantially perpendicular to the x-axis.

5. The motion sensor of claim 3 wherein the grooves of the second optical element face toward the detector elements.

6. The motion sensor of claim 3 wherein the first optical element is a Fresnel lens array having a plurality of lenslets.

7. A motion sensor, comprising:

a housing;

a Fresnel lens array located at a forward portion of the housing, the lens array having a plurality of lenslets for transmitting and focusing infrared radiation;

a pyroelectric detector having two elements located side-by-side and separated from each other along an x-axis by a selected gap, the elements being at a rearward portion of the housing for receiving focused infrared radiation transmitted through the lenslets; and a negative, Fresnel reducing lens having a plurality of inclined grooves interconnected by transition surfaces, the reducing lens being located between the lens array and the detector within the housing for providing an optical effect of a smaller gap than said selected gap.

8. The motion sensor of claim 7 wherein the grooves of the reducing lens run in straight lines substantially perpendicular to the x-axis.

9. The motion sensor of claim 7 wherein the grooves of the reducing lens face toward the detector elements.

10. The motion sensor of claim 7 wherein the grooves of the reducing lens are acylindrical surfaces.

11. A method for decreasing the space between zones in a motion sensor, comprising:

providing a housing with a focusing optical element and a pyroelectric detector having two side-by-side elements;

focusing infrared radiation from two zones from a field of view along an optical path onto the detector, with radiation from one of the zones being focused on each of the elements of the detector; and then positioning a reducing optical element in the optical path for reducing the size of the image of the detector.

* * * * *